US010904094B2

(12) United States Patent
Goldman et al.

(10) Patent No.: US 10,904,094 B2
(45) Date of Patent: Jan. 26, 2021

(54) EXTENDING A KNOWN TOPOLOGY OF A NETWORK USING DATA OBTAINED FROM MONITORING THE NETWORK

(71) Applicant: CA, Inc., Islandia, NY (US)

(72) Inventors: Jason D. Goldman, Fort Collins, CO (US); Scott W. Strobel, Loveland, CO (US); Mark S. LoSacco, Scarborough, ME (US); Peter W. Mullarkey, Fort Collins, CO (US); Aby Paul, Fort Collins, CO (US)

(73) Assignee: CA, INC., New York, NY (US)

( * ) Notice: Subject to any disclaimer, the term of this patent is extended or adjusted under 35 U.S.C. 154(b) by 468 days.

(21) Appl. No.: 15/473,551

(22) Filed: Mar. 29, 2017

(65) Prior Publication Data
US 2018/0287875 A1   Oct. 4, 2018

(51) Int. Cl.
*H04L 12/24* (2006.01)
*H04L 29/12* (2006.01)

(52) U.S. Cl.
CPC ............ *H04L 41/12* (2013.01); *H04L 61/103* (2013.01)

(58) Field of Classification Search
CPC ........ H04L 41/12; H04W 84/18; H04W 24/00
See application file for complete search history.

(56) References Cited

U.S. PATENT DOCUMENTS

| | | | | |
|---|---|---|---|---|
| 2010/0026686 | A1* | 2/2010 | Koo | H04L 41/12 345/440 |
| 2012/0239797 | A1* | 9/2012 | Agrawal | H04L 41/145 709/224 |
| 2013/0108259 | A1* | 5/2013 | Srinivas | H04L 45/20 398/25 |
| 2013/0148547 | A1* | 6/2013 | Page | H04L 67/12 370/255 |
| 2015/0016298 | A1* | 1/2015 | Ganichev | H04L 43/026 370/253 |

OTHER PUBLICATIONS

"CA Network Flow Analysis," CA Technologies, 2014 (2 pages).
"CA Application Performance Management," CA Technologies, 2017 (2 pages).

(Continued)

*Primary Examiner* — Oleg Survillo
*Assistant Examiner* — Christopher P Cadorna
(74) *Attorney, Agent, or Firm* — Morgan, Lewis & Bockius LLP

(57) ABSTRACT

In embodiments, a known network relation is generated from a known topology of a network and is sent to a first data source agent associated with a first tool configured to monitor the network. A first contextual topology of the network is received from the first data source agent and is based on the known network relation and first data associated with the first tool. An extended topology is generated by reconciling the known topology with at least the first contextual topology. In further embodiments, a derived network relation is received from the first data source agent. The derived network relation is sent to a second data source agent. Second contextual topology based, at least in part, on the derived network relation can be received from the second data source agent. An updated extended topology based, at least in part, on the second contextual topology can be generated.

24 Claims, 7 Drawing Sheets

(56) References Cited

OTHER PUBLICATIONS

"CA Application Delivery Analysis," CA Technologies, 2014 (2 pages).
"Five Factors to Consider When Selecting an Application Performance Management (APM) Solution," Apprise 360, LLC and CA Technologies, 2016 (3 pages).
"CA Performance Management," CA Technologies, 2017 (2 pages).

* cited by examiner

EXTENDING A KNOWN TOPOLOGY OF A NETWORK USING DATA OBTAINED FROM MONITORING THE NETWORK

BACKGROUND

The present disclosure relates in general to the computer networks, and more specifically, to extending a known topology of a network using data obtained from monitoring the network.

Modern software systems often include multiple programs or applications working together to accomplish a task or deliver a result. For instance, a first program can provide a front end with graphical user interfaces with which a user is to interact. The first program can consume services of a second program, resources of one or more databases, or other programs or data structures. In some cases, multiple interoperating computer programs and resources can be controlled or developed by a single entity, such as a single enterprise, publisher, or developer. In other instances, interoperating programs and resources can be developed and controlled by different parties. Software monitoring products (or "tools") can provide numerous different functionalities related to such programs and resources provisioned in a network or multiple interconnected networks. Different tools may have different views of the entities and relationships within such networks. For instance, one tool may have a view that provides information related to particular entities and their interactions in a network, which could be beneficial to another tool having a different view of entities and their interactions in the network.

BRIEF SUMMARY

According to one aspect of the present disclosure, a known network relation can be generated from a known topology of a network. The known network relation can be sent to a first data source agent associated with a first tool that is configured to monitor the network. A first contextual topology of the network can be received from the first data source agent. The first contextual topology can be based on the known network relation and first data associated with the first tool. An extended topology can be generated by reconciling the known topology with at least the first contextual topology.

According to a further aspect of the present disclosure, a derived network relation can be received from the first data source agent. The derived network relation can be sent to a second data source agent associated with a second tool configured to monitor the network. A second contextual topology of the network can be received from the second data source agent. The second contextual topology can be based on the derived network relation and second data associated with the second tool. An updated extended topology of the network can be generated where the updated extended topology is based, at least in part, on the second contextual topology.

BRIEF DESCRIPTION OF THE DRAWINGS

Like reference numbers and designations in the various drawings indicate like elements.

DETAILED DESCRIPTION

Figure 1:
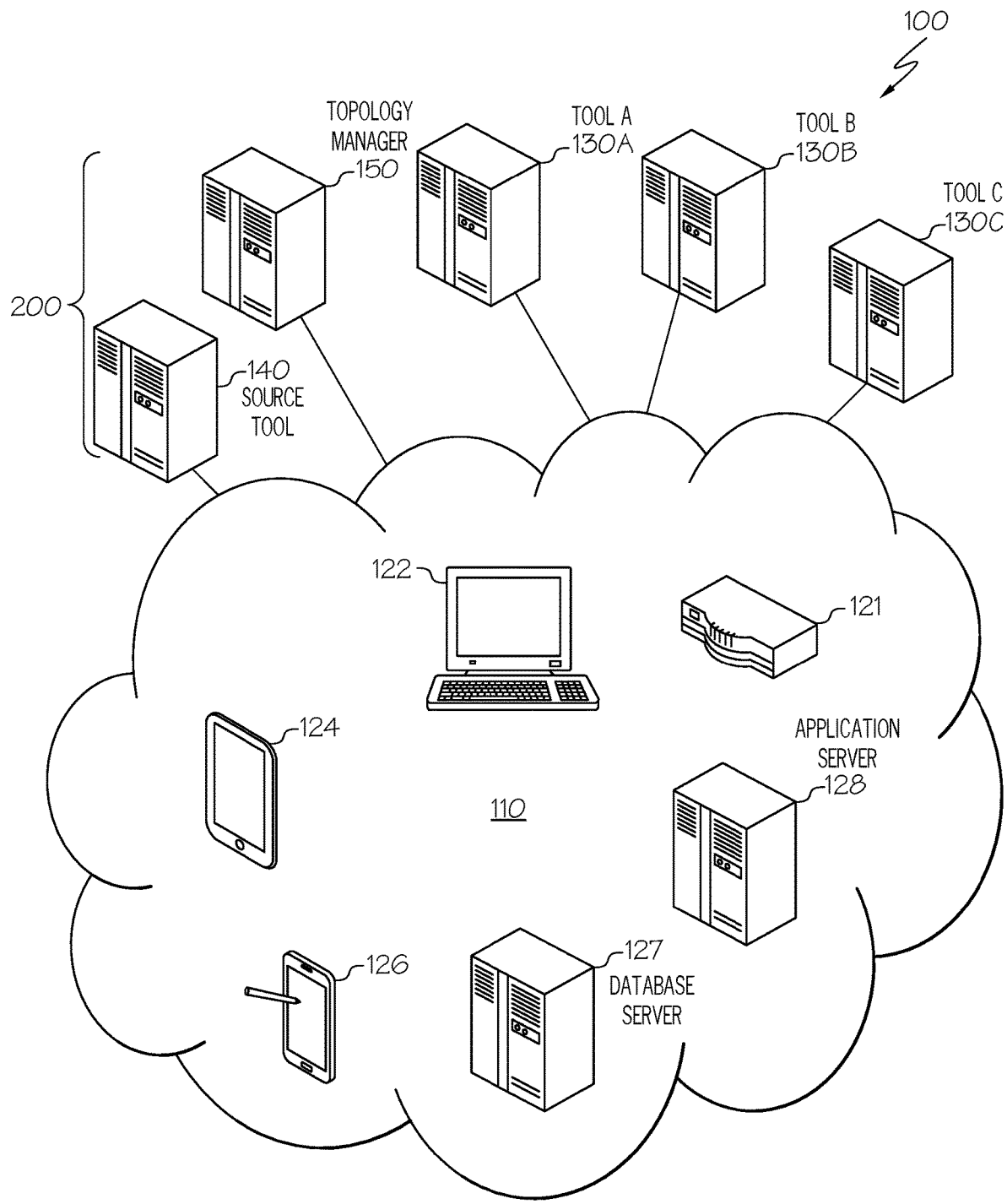
FIG. 1 is a simplified schematic diagram of an example computing environment for extending a known topology of a network in accordance with at least one embodiment.

As will be appreciated by one skilled in the art, aspects of the present disclosure may be illustrated and described herein in any number of patentable classes or contexts including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," "logic," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency (RF), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, assembly language, or other programming languages. The program code may execute entirely on a local computer (e.g., server, server pool, desktop, laptop, appliance, etc.), partly on the local computer, as a stand-alone software package, partly on the local computer and partly on a remote computer or entirely on a remote computer. In the latter scenarios, the remote computer may be connected to the local computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS). Generally, any combination of one or more local computers and/or one or more remote computers may be utilized for executing the program code.

Aspects of the present disclosure are described herein with reference to flowchart illustrations, interaction diagrams, and/or block diagrams of methods, apparatuses (systems) and computer program products according to embodiments of the disclosure. It will be understood that each block of the flowchart illustrations and/or block diagrams, each interaction of the interaction diagram, combinations of blocks in the flowchart illustrations and/or block diagrams, and/or combinations of interactions in the interaction diagram can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram blocks and/or functions/acts specified in the interactions of the interaction diagram.

These computer program instructions may also be stored in a computer readable medium that, when executed, can direct a computer, other programmable data processing apparatus, or other devices to function in a particular manner, such that the instructions when stored in the computer readable medium produce an article of manufacture including instructions that, when executed, cause a computer to implement the function/act specified in the flowchart and/or block diagram block or blocks and/or the function/act specified in the interactions of the interaction diagram. The computer program instructions may also be loaded onto a computer, other programmable instruction execution apparatus, or other devices to cause a series of operations to be performed on the computer, other programmable apparatuses or other devices to produce a computer implemented process such that the instructions, which execute on the computer or other programmable apparatus, provide processes for implementing the functions/acts specified in the flowchart and/or block diagram block or blocks and/or functions/acts specified in the interactions of the interaction diagram.

Referring now to FIG. 1, a simplified block diagram is shown illustrating an example computing environment 100 in which a system 200 enables extending a known topology of a network (e.g., 110) based on network data associated with tools that monitor the network. Example computing environment 100 includes a source tool 140, a tool A 130A, a tool B 130B, a tool C 130C, a topology manager 150, and other entities in network 110 that may be monitored by one or more of the tools (e.g., 130A-130C, 140). Source tool 140, topology manager 150, and tools 130A-130B may be provisioned in one or more servers or other suitable computing devices. Examples of entities in network 110 include, but are not limited to, application servers (e.g., 128), database servers (e.g., 127), mainframe systems, web servers, network elements (e.g., 121), client devices such as laptops (e.g., 122), smart phones (e.g., 124), and other mobile devices (e.g., 126), and any other device, component, element, or object operable to exchange information in network 110. One or more of the application servers, database servers, network elements, and/or applications, programs, databases, resources, etc. running on the entities may be virtualized according to embodiments disclosed herein. Additionally, the entities may be identified as nodes in network 110 that are capable of exchanging electronic information via one or more networks.

With reference to various elements of FIG. 1, a description of the infrastructure of computing environment 100 is now provided. Elements of FIG. 1 may be coupled to one another through one or more interfaces employing any suitable connections (wired or wireless), which provide viable pathways for network communications. Additionally, any one or more of these elements of FIG. 1 may be combined or removed from the architecture based on particular configuration needs. For example, source tool 140, topology manager 150, and/or tools 130A-130C may be implemented in a single physical machine or in multiple physical and/or virtual machines.

Generally, system 200 can be implemented in any type or topology of networks. Within the context of the disclosure, networks such as network 110 represents a series of points or nodes of interconnected communication paths for receiving and transmitting packets of information that propagate through communication system 100. These networks offer communicative interfaces between sources, destinations, and intermediate nodes, and may include any local area network (LAN), virtual local area network (VLAN), wide area network (WAN) such as the Internet, wireless local area network (WLAN), metropolitan area network (MAN), Intranet, Extranet, virtual private network (VPN), and/or any other appropriate architecture or system that facilitates communications in a network environment or any suitable combination thereof. Additionally, radio signal communications over a cellular network may also be provided in communication system 100. Suitable interfaces and infrastructure may be provided to enable communication with the cellular network.

Communications in computing environment 100 may be inclusive of messages, requests, responses, replies, queries, etc. Communications may be sent and received according to any suitable communication messaging protocols, including protocols that allow for the transmission and/or reception of packets in a network. Suitable communication messaging protocols can include a multi-layered scheme such as Open Systems Interconnection (OSI) model, or any derivations or variants thereof (e.g., transmission control protocol/IP (TCP/IP), user datagram protocol/IP (UDP/IP), etc.). Particular messaging protocols may be implemented in computing environment 100 where appropriate and based on particular needs.

In general, "servers," "clients," "computing devices," "network elements," "database servers," "application servers," "user devices," "mobile devices," "systems," etc. (e.g., 121, 122, 124, 126, 127, 128, 130A-130B, 140, 150, etc.) in example computing environment 100, can include electronic computing devices operable to receive, transmit, process, store, or manage data and information associated with the computing environment 100. As used in this document, the term "computer," "processor," "processor device," "processing element," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, computing devices, network elements, database servers, application servers, user devices, mobile devices, systems," etc. (e.g., 121, 122, 124, 126, 127, 128, 130A-130B, 140, 150, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, source tool 140, topology manager 150, tools 130A-130C, or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in computing environment 100. In some instances, source tool 140, topology manager 150, and/or tools 130A-130C may be at least partially implemented locally in network 110. In some instances, a server, system, subsystem, computing device, etc. can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

For purposes of illustrating certain example techniques of system 200 for extending a known topology of a network using network data associated with monitoring the network, it is important to understand the activities that may be occurring in computing environment 100. The following foundational information may be viewed as a basis from which the present disclosure may be properly explained.

In modern computer networks, application and network management tools (e.g., 130A-130C, 140) are frequently provisioned in computing environments (e.g., 110) to enable functions related to monitoring and managing a network (e.g., 110) and its entities (e.g., 121, 122, 124, 126, 127, 128, etc.). Examples of such functions can include, but are not limited to, monitoring, troubleshooting, flow tracking and analysis, performance management, quality improvements, optimizations, change management, and reporting. Generally, these tools (e.g., 130A-130C, 140) are in the form of programs that may be provisioned in one or more servers and one or more databases and accessed via a console or client device. Some tools may provision agents in a computing environment to monitor devices, applications, transactions, network flows, processes, and any other entity or communication for which information is available.

Some tools (e.g., 140) monitor only selected entities (e.g., 121, 122, 124, 126, 127, 128, etc.) and interactions within their network (e.g., 110). Some of these tools allow users to select entities within their network and install agents that track interactions between those specific entities. Those entities and interactions can be characterized with a simple topology. Other tools may automatically select pre-determined entities within a network in which agents can be installed to track interactions. The topology for these user-selected or pre-determined entities and interactions are referred to herein as a "known" topology as opposed to a generally discovered topology. A known topology can advantageously reflect the focus of the tool's functionality by presenting the user with a context that filters out irrelevant entities. However, other relevant entities may exist in the network that are related to, but not included in, the known topology. Although such entities may not be known or discovered by the tool (e.g., 140), adding these entities could expand the starting context for users. Additionally, other tools (e.g., 130A-130C) might be able to provide useful information about the initially selected entities in addition to discovering new, related entities.

Figure 2:
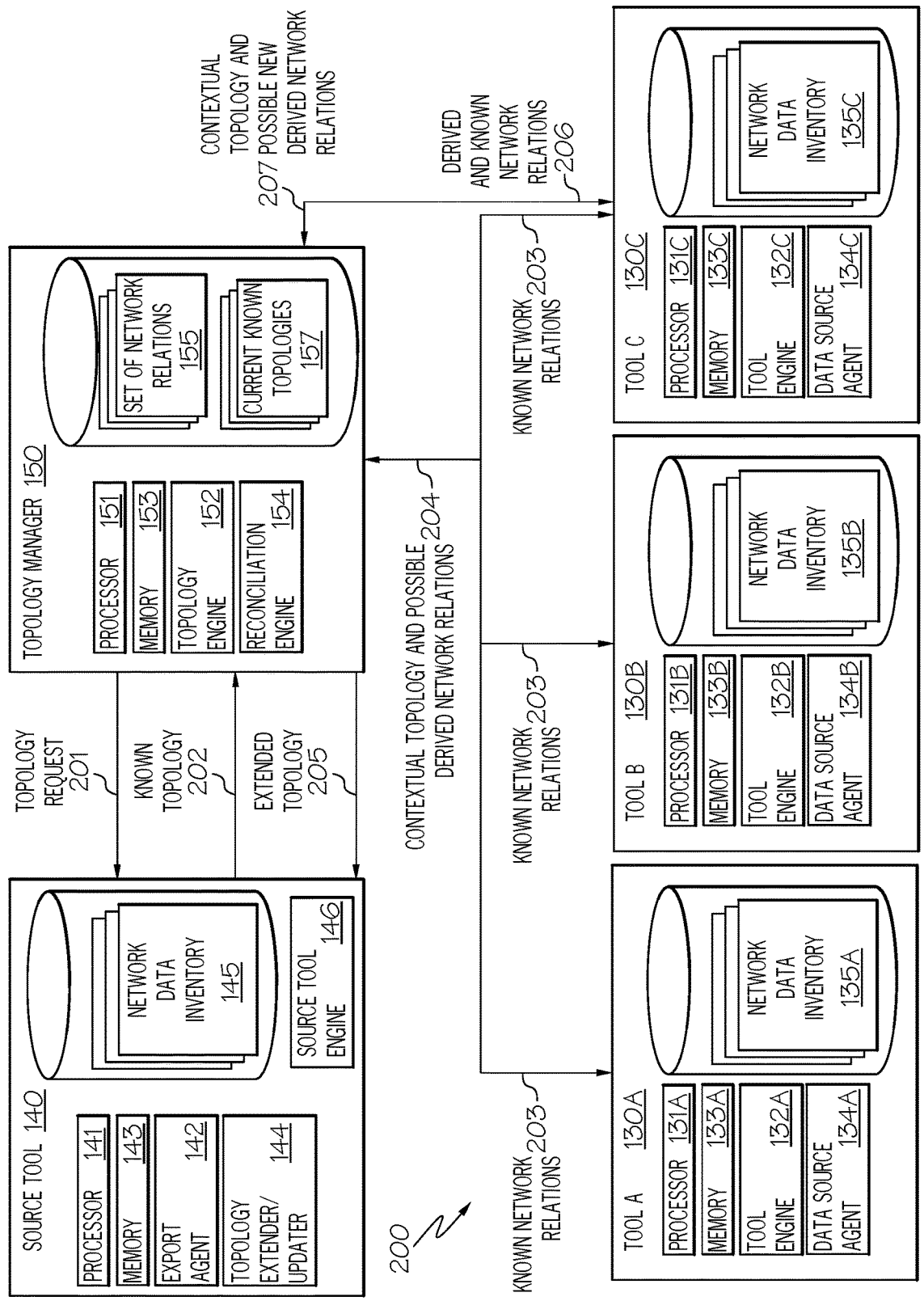
FIG. 2 is a simplified block diagram including additional possible details that may be associated with certain components of the example computing environment in accordance with at least one embodiment.

A system for extending a known topology of a network using data obtained from monitoring the network, such as system 200 outlined in FIGS. 1 and 2, can resolve these issues and others. In at least one embodiment, a source tool (e.g., 140) that monitors a network (e.g., 110) supplies a known topology to a topology manager (e.g., 150). The known topology can represent a selected set of entities and relationships in the network, which may be user-defined or otherwise pre-defined as the selected set. Respective data source agents (134A-134B) are provided for other tools (e.g., 130A-130C) in the network, where the other tools monitor different aspects of the network and each have their own perspective of the network. The topology manager can pass the known topology to the data source agents. Each data source agent attempts to relate the known topology to its own inventory of entities and relationships, and may provide a contextual topology back to the topology manager. The topology manager can then coordinate responses from the data source agents and reconcile them into an extended topology to provide to the source tool. As part of coordination and reconciliation, elements of the extended topology may be shared with the data source agents, creating a feedback loop where one tool may provide useful context to another. In addition to extending the topology, the data source agents can also supply metrics information and/or event information to the source tool that could be useful to the source tool's users.

Embodiments of system 200 disclosed herein provide several advantages. Embodiments can enhance and improve the ability of a user to obtain useful information within the context of a user-selected set of entities and relationships monitored by a network monitoring tool (also referred to herein as 'source tool'). Embodiments can provide an extended topology of a network while maintaining the context of a user-selected set of entities in the network by filtering the scope of added topology and other information to relevant contributions. Although a source tool may enable a user to select a set of entities and/or relationships for monitoring and possibly other forms of management, it should be apparent that embodiments disclosed herein can maintain the context of any defined set of entities, regardless of how the set is selected or defined, when extending the network topology. For example, some source tools may provide a pre-defined (or default) set of entities or enable targeted discovery of a set of entities and/or relationships in the network. Maintaining the context of a selected set of entities in a network, while providing additional relevant information, allows users to better understand any issues or statuses beyond the feature set and scope of the original network tool. Thus, the usefulness of the source tool and other information-contributing tools used in a network, can be significantly enhanced while avoiding inundating the user with data that could result from free and boundless discovery of entities and relationships in the network.

Embodiments disclosed herein also allow for integration of information available from multiple monitoring tools of a network, where the monitoring tools provide extended topology and other contextual information to a source tool. In at least some embodiments, a respective data source agent is provisioned for each monitoring tool. While each data source agent integrates its contextual topology (or topologies) and attributes into a topology manager, a feedback mechanism uses derived network relations to provide a generic path to integration that does not require the data source agents to be directly connected with one another.

In at least some embodiments, integration with a source tool can be facilitated by providing: 1) a mechanism to export the source tool's known topology, 2) an interface to extend the known topology, and 3) support for adding attributes to entities within the known topology. In some embodiments, these capabilities may be incorporated in a source tool. System 200, however, could also be implemented using a source tool that is not provisioned with these capabilities. In this scenario, the capabilities could be implemented by data mining the source tool to export the source tool's known topology and supplying external user interfaces that correlate to the source tool data view.

Turning to FIG. 2, FIG. 2 is a simplified block diagram illustrating possible details that may be associated with system 200 for extending a known topology of a network (e.g., 110) from source tool 140 using data obtained by monitoring the network with tools 130A-130C. Source tool 140 and tools 130A-130C may each provide different monitoring capabilities for entities, applications running on the entities, and/or interactions in a network, such as network 110. Examples of such monitoring capabilities include, but are not limited to, observation, management, troubleshooting, performance optimization, capacity management, end-to-end response time monitoring, and performance metrics collection. In at least some examples, source tool 140 and/or one or more of tools 130A-130C may include monitoring agents that are provisioned on, or in communication with, one or more entities within the network being monitored. Such monitoring agents may collect data as a result of their monitoring activities and send the collected data to their respective tools for storing, analysis and/or other actions related to the data. Additionally, the monitoring capabilities of a source tool (e.g., 140) and the other monitoring tools (e.g., 130A-130C) can vary based on the implementation and needs of the particular network being monitored by those tools. Different types of monitoring tools may serve as a source tool of the system if the tool can provide a partial view of a network (e.g., selected set of entities and relationships) as opposed to a view of the network obtained from a generalized discovery process. This partial view of a network can be user-defined or otherwise pre-defined by the source tool, and is referred to herein as the source tool's "known topology" of the network.

By way of example and only for ease of explanation, source tool 140 and tools 130A-130C may be discussed herein as having the following monitoring capabilities: 1) Source tool 140 could provide application monitoring capabilities across physical, virtual, cloud, and mobile applications; 2) Tool A 130A could provide end-to-end response time monitoring capabilities; 3) Tool B 130B could provide Simple Network Management Protocol (SNMP) monitoring capabilities for monitoring network-attached devices that support SNMP (e.g., routers, switches, servers, workstations, printers); and 3) Tool C 130C could provide network flow monitoring capabilities such as observation and analysis of network flows and sources of those flows. Each tool could provide a different view of the topology of network 110. It should be appreciated, however, that embodiments of a system for extending a known topology as described herein could be applied to any number of combinations of tools that provide various monitoring capabilities to a network.

Example system 200 can include source tool 140, topology manager 150, and tools 130A-130C, each of which may be implemented on separate physical or virtual machines such as servers. In other implementations, these elements of example system 200 may be combined in any suitable way in one or more single physical or virtual machines. One or more of these elements may be provisioned in a network being monitored (e.g., 110) or may be cloud-implemented or otherwise distributed to remotely provide monitoring and/or topology extending capabilities to a network (e.g., 110) in computing environment 100. For ease of illustration, FIG. 2 shows each of the elements (e.g., 130A, 130B, 130C, 140, 150) residing on separate physical or virtual machines.

Source tool 140 can include one or more processors 141 and one or more memory elements 143 for use in implementing executable modules, such as source tool engine 146, export agent 142, topology extender/updater 144, etc. and for storing data, such as the source tool's network data inventory 145, in a database or other suitable storage structure. Source tool engine 146 can be configured to provide certain monitoring capabilities associated with a selected set of entities and/or relationships of a network, such as application monitoring for example. In an embodiment, source tool 140 may also be configured with export agent 142, which is a mechanism to export a known topology. A known topology can be derived from the source tool's network data inventory 145, and can provide a selected view of a topology of entities and relationships in a network (e.g., 110). This selected view of network entities and relationships may be based on a user-defined or otherwise pre-defined (e.g., default view provided by the source tool) set of entities and relationships in the network, rather than a view based on a general discovery process.

In at least one embodiment, a known topology from a source tool may be provided in the form of a graph of vertices and edges, where the vertices correspond to selected nodes (e.g., entities) within the network and edges represent interactions or connections (e.g., relationships) between the selected entities. In one example, a vertex corresponding to a particular node may be represented by a network address (e.g., Internet Protocol (IP) address), media access control (MAC) address, one or more ports, and any other suitable identifying information of the node. An edge may be indicated as an interaction or connection between two vertices (e.g., source Internet Protocol (IP) address, source port, destination IP address, destination port).

Source tool 140 may also be configured with topology extender/updater 144, which is an interface to extend the known topology of source tool 140 based on extended network topologies received from topology manager 150. The known topology can be extended by adding new entities, where the new entities were identified within the context of the known topology by data source agents (e.g., 134A-134C) associated with other monitoring tools of the network (e.g., 130A-130C). Topology extender/updater 144 can also be configured to add attributes to entities within the known topology (or within the extended topology), where the attributes were identified and provided by one or more of the data source agents associated with the other monitoring tools of the network. Although source tool 140 may be configured with an integrated topology extender/updater (e.g., 144) and export agent (e.g., 142), as shown in FIG. 2, it should be apparent that in other embodiments, these capabilities may be provided by separate modules, objects, components or logic that communicate with source tool 140 and/or data provided by source tool 140. For example, the export operations could be based on data mining the source tool (e.g., network data inventory 145). Also, extending the topology and/or adding attributes to selected entities could be accomplished by external user interfaces that correlate to the source tool data view.

Tools 130A, 130B, and 130C can include, respectively, one or more processors 131A, 131B, and 131C and one or more memory elements 133A, 133B, and 133C for use in implementing executable modules. Executable modules of tools 130A, 130B, and 130C can include, respectively, tool engines 132A, 132B, and 132C, which are each configured with certain monitoring capabilities applied to a network (e.g., 110). Each tool 130A, 130B, and 130C can store and maintain, in a database or other suitable storage structure, respective network data inventories 135A, 135B, and 135C related to nodes and/or connections in the network (e.g., 110) the tools are monitoring. Network data inventory for a particular tool can include, for example, information identifying nodes monitored by the tool, information identifying connections monitored by the tool, attributes of the nodes monitored by the tool, and/or uniform resource locators (URLs) associated with the tool. Examples of attributes of nodes and/or connections monitored by a tool can include, but are not limited to, tool-specific identifiers, global identifiers, contextual names, and/or contextual data. These attributes could be generated, obtained, determined and/or maintained by the tool.

In at least one embodiment, tools 130A, 130B, and 130C can be provisioned with, or otherwise in communication with, respective data source agents 134A, 134B, and 134C. Each data source agent has its own perspective of the network (e.g., 110) that is being monitored by its associated tool. The data source agents each communicate with topology manager 150 to provide contextual topologies from each tool's perspective. These contextual topologies can be used to extend the known topology of source tool 140.

Topology manager 150 can include one or more processors 151 and one or more memory elements 153 for use in implementing executable modules such as topology engine 152, reconciliation engine 154, etc. and for storing a set of network relations 155 and current known topologies 157 in one or more databases, caches, or other suitable storage elements. Topology engine 152 collects a known topology, as needed, from source tool 140. For example, topology manager 150 can send a topology request 201 to source tool 140 for the known topology. Export agent 142 can extract a known topology from the source tool's network data inventory 145 and then, as indicated by 202, the known topology can be communicated to topology manager 150. The known topology may be stored in a storage element containing current known topologies 157.

Topology engine 152 can extract one or more known network relations from the known topology of the network, and these known network relations can be stored in a storage element (e.g., a cache) in a set of network relations (e.g., 155). In an example, the set of network relations is a minimal form of data indicating relationships between topological entities in the network. This minimal form can be represented in any suitable manner including, for example, a set of edges having the form of: [source IP address, source port, destination IP address, destination port]. In another example, the minimal form could be a list of nodes and connections: [IP address/port] [source:node1, dest:node2]. In yet another example, nodes could be tagged with identifying attributes other than (or in addition to) IP address/port. Generally, the set of network relations is configured to enable data source agents (e.g., 134A-134C) to find equivalent entities within their respective network data inventories (e.g., 135A-135C) and return contextual topologies to topology manager 150.

As indicated by 203, known network relations from the known topology received by topology manager 150 can be passed to data source agents 134A-134C associated with tools 130A-130C. In at least one embodiment, the known network relations can be communicated to multiple data source agents (e.g., 134A-134C) in parallel, with each data source agent receiving the same known network relations. Each data source agent can attempt to match or otherwise identify correspondences of the nodes and relationships indicated in the known network relations to entities identified in the network data inventory (e.g., 135A-135C) of the associated tools (e.g., 130A-130C). For example, tool A 130A may track servers, clients, and applications within the context of Transmission Control Protocol (TCP) sessions. Given a set of network relations, data source agent 134A can perform a database query to identify client/server/application matches for each known network relation. A match can indicate that tool A 130A has stored data on a TCP session between a source IP address and a destination IP address/port of a particular known network relation.

A data source agent (e.g., 134A-134C) can construct its version of the topology based, at least in part, on successful database queries, where the queries use a received set of network relations (e.g., known network relations 203). A data source agent's version of the topology is referred to herein as "contextual topology." Contextual topology is a network topology provided by a data source agent in the context of a network relation. Network relations may be received from a topology manager (e.g., 150). A data source agent may provide a contextual topology for each network relation of which it is aware and has data. For a given network relation, if a query of a network data inventory based on the network relation results in a match, a contextual topology may be generated by the data source agent and can include information identifying nodes that represent endpoints (e.g., vertices) of the network relation, information identifying connections between the nodes (e.g., edges), and possibly attributes associated with the nodes and/or connections. This information can be mapped to, or otherwise associated with, the given network relation, both of which can be returned to topology manager 150 as indicated at 204.

In a more specific example, if tool A 130A performs end-to-end response time monitoring, contextual topologies constructed by data source agent 134A could include information identifying nodes to represent the session endpoints, along with information identifying connections between those session endpoints. If the nodes have additional attributes, these attributes (e.g., tool-specific identifiers, global identifiers, contextual names, contextual data, etc.) can be provided in the contextual topology. Other information such as a uniform resource locator (URL) may also be included in the contextual topology, where the URL can provide access to more detailed information from tool A 130A.

A contextual topology can also include containing relationships, if any, in addition to simple data connections. A containing relationship is intended to include a relationship contained within, and therefore dependent on, a particular node. Examples of containing relationships may include, but are not limited to interfaces within a network element (e.g., a router, switch, etc.) and ports on a server.

A data source agent (e.g., 134A-134C) can also search for additional relevant network topology based on the network relations received from topology manager 150. In addition to simple mapping queries using the network relations, the data source agent can search for other connections related to the nodes identified in the network relations. For example, this can be especially useful for finding client regions that connect into a given system (e.g., a web server, etc.) in the known topology. Derived network relations can be generated to represent the additional discovered nodes and connections. A contextual topology related to a derived network relation can also be generated by the data source agent that discovers the derived network relation. The contextual topology related to the derived network relation could include information identifying nodes that represent endpoints (e.g., vertices) of the derived network relation, information identifying connections between the nodes (e.g., edges), and possibly attributes associated with the nodes and/or connections. This contextual topology could be mapped to, or otherwise associated with, the derived network relation, both of which can be returned to topology manager 150 as indicated at 204. Accordingly, a derived network relation can extend the scope of the known topology as well as providing an additional network relation to be communicated to other data source agents associated with other tools.

In an embodiment, reconciliation engine 154 of topology manager 150 can reconcile results (including contextual topologies and derived topologies) from multiple data source agents (e.g., 134A-134C) with each other and with the known topology that was received from source tool 140. An extended topology can be generated from the reconciliation of the known topology with the received contextual topology (or topologies). Reconciliation can be performed using any suitable technique to generate an extended topology in which information (e.g., identifying information for nodes and connections, attributes, etc.) that is contained in the contextual topology or topologies, but not contained in the known topology, is combined with (or added to) the known topology to create the extended topology. In one non-limiting example, if multiple contextual topologies are received, the contextual topologies can be reconciled into a single contextual topology, and then an extended topology can be generated by reconciling the known topology with the single contextual topology. After reconciliation, the extended topology, possibly including new entities, new relationships, and/or additional attributes, can be communicated to source tool 140 as indicated at 205.

If topology manager 150 receives any derived network relations from the data source agents (e.g., 134A-134C), then a feedback loop may take effect. The feedback loop takes effect when the topology manager communicates derived network relations received from a data source agent (e.g., 134A-134C) to other data source agents. The derived network relations received from a data source agent may also be communicated back to that same data source agent. In one embodiment, the derived network relations received from one or more data source agents can be added to the set of network relations 155, which may include the known network relations previously communicated to the data source agents. Thus, the set of network relations can be effectively updated to include the derived network relations.

In some scenarios, a topology manager may wait for a defined period of time after generating an extended topology and communicating the extended topology to the source tool. After the period of time expires, topology manager 150 may again send a topology request to source tool 140 for a known topology, as indicated at 201. In some scenarios, the view of the topology of the network (e.g., 110) by source tool 140 may have changed (e.g., added vertices and/or edges, removed vertices and/or edges). Source tool 140 can communicate its newly-generated known topology to topology manager 150, as indicated at 202. This newer known topology can be used to update the set of network relations in the cache of network relations 155. For example, a network relation in the cache may be removed if a node in the network relation is not present in the newer known topology. Similarly, a new known network relation may be added to the set of network relations if the newer known topology includes a new edge or connection between two entities that was not identified in the older known topology.

The updated set of network relations, including derived network relations and known network relations as updated from the newer known topology, can be communicated to each data source agent. For ease of illustration, this communication is indicated only with reference to data source agent 134C at 206. It should be apparent, however, that the updated set of network relations can be communicated to every data source agent of the system (e.g., 134A, 134B, and 134C). It should also be apparent that in some scenarios, it may be beneficial to communicate only the most recently derived network relations until an evaluation of the entire updated set of network relations is needed, useful, or otherwise desired.

A data source agent (e.g., 134C) that receives the updated set of network relations can attempt to match or otherwise identify correspondences of the nodes and connections identified in the updated set of network relations to entities identified in the network data inventory (e.g., 135C) of its associated tool (e.g., 130C). The derived network relations included in the updated set of network relations may add enough context for the data source agent to recognize more nodes and connections that fit the context. If such nodes and connections are identified, then new derived network relations can be generated along with contextual topologies related to the new derived network relations. These new derived network relations and related contextual topologies can be communicated back to topology manager 150, as indicated at 207.

For any other successful query that is based on a network relation from the updated set of network relations, but that does not result in the discovery new topology, the data source agent can construct a contextual topology based on the contextual information obtained from the query (e.g., attributes, contextual names, etc.) and the network relation used to find the data. Thus, a contextual topology could be generated for a successful query of either a known network relation or a derived network relation from the set of network relations received by the data source agent from the topology manager. This contextual topology (and the network relation related to the contextual topology) can be communicated back to topology manager 150, as indicated at 207.

Topology manager 150 can then perform reconciliation, generate an updated extended topology, and communicate the updated extended topology to source tool 140. If topology manager 150 receives new derived network relations from the data source agent, the set of network relations 155 may be updated with the new derived network relations. Another feedback loop can take effect when the newly updated set of network relations, which includes the new derived network relations, is communicated to other data source agents.

Figure 3:
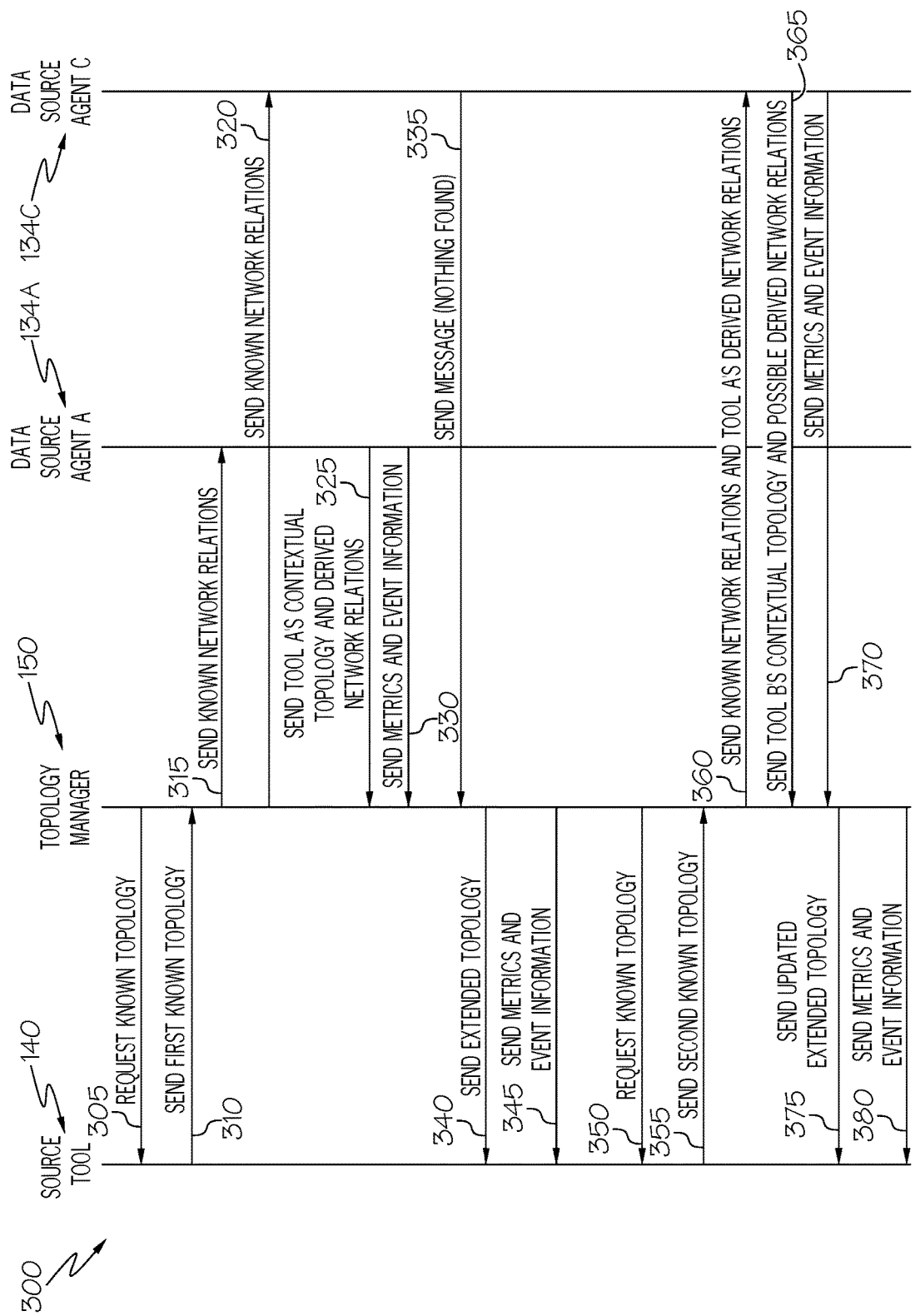
FIG. 3 is a simplified interaction diagram illustrating possible interactions between certain components of the example computing environment in accordance with at least one embodiment.

Turning to FIG. 3, a simplified interaction diagram 300 illustrates potential communications between selected components of system 200. In particular, source tool 140, topology manager 150, data source agent 134A, and data source agent 134C are included in interaction diagram 300. For purposes of illustration, interaction diagram 300 will be explained with reference to an example scenario in which these components may interact. Accordingly, for this illustration, it is assumed that source tool 140 provides application monitoring of network 110, tool A 130A (associated with data source agent 134A) provides end-to-end response time monitoring of network 110, and tool C 130C (associated with data source agent 134C) provides network flow monitoring of network 110.

At 305, topology manager 150 requests a known topology from source tool 140. At 310, source tool 140 communicates a first known topology to topology manager 150. In one embodiment, an export agent (e.g., 142) may be provisioned as part of source tool 140 and generate the first known topology that is communicated to topology manager. In other embodiments, an export agent may be provisioned separately from source tool 140 and may perform data mining of a storage element containing the source tool's network data inventory 145 in order to generate the first known topology.

For purposes of this illustration, the first known topology includes information (e.g., an edge in a network topology graph) that represents a connection between a front end client (FE1), such as a web server, and a back end server (BE) at port 80. Topology manager 150 extracts this information to generate a known network relation such as: [FE1 IP address, BE IP address, BE port 80]. This network relation (and any others extracted from the first known topology) can be stored in a storage element (e.g., a cache, etc.) in a set of network relations (e.g., 155).

At 315, the set of network relations can be sent to data source agent 134A, and at 320, the same set of network relations can be sent to data source agent 134C. In this first pass of topology manager 150 communicating with data source agents 134A and 134C, the set of network relations may include only the known network relations extracted from the first known topology. Communications at 315 and 320 can occur in parallel, or substantially in parallel, in at least one embodiment. Data source agent 134A can query network data inventory 135A associated with tool A 130A, where the query is based on the network relation that represents the connection between FE1 and BE (port 80). The query may return a match for the network relation, including information related to a server for FE1, a server for BE, and an application instance for port 80 on BE. The data source agent's version of the BE server would contain the application instance based on its end-to-end monitoring communications between FE1 and BE. The query may also return attributes for each of the servers and the application.

Additionally, data source agent 134A may perform other queries with respect to the individual servers, FE1 and BE (port 80). Those queries may find one or more external client regions that access FE1, for example. Data source agent 134A can generate derived network relations for endpoints of the client region and FE1, in addition to contextual topologies related to the derived network relations. Data source agent 134A can also generate a contextual topology for the FE1-BE network relation. The contextual topology can include information identifying the server for FE1, the server for BE, the application instance for port 80 on BE, and the connection between FE1 and BE (port 80). The contextual topology can also include the attributes for each of the servers and the application. At 325, the results of processing the set of network relations by data source agent 134A can be communicated to topology manager 150. The results can include tool A's contextual topologies for the known network relations (e.g., FE1-BE network relation). The results can also include contextual topologies related to derived network relations (e.g., FE1-client region) discovered by data source agent 134A. In addition, the results can include the known network relations and the derived network relations associated with the contextual topologies.

At 330 (or at any other suitable times), data source agent 134A can communicate, to topology manager 150, metrics and event information that are relevant to the contextual topology or topologies generated by data source agent 134A. In particular, a tool (e.g., 130A-130C) may collect and maintain metrics and event information associated with nodes and/or connections between the nodes that are identified in contextual topologies that the tool has provided to topology manager 150. For example, a source tool may know about a database server and an application server, but may have limited information about the communication between them. Another tool that provides end-to-end monitoring of network sessions, however, could potentially provide server response time metrics or refused session metrics related to the database server and application server. Thus, metrics information may be communicated from a data source agent associated with that tool in the context of the database server and application server. Additionally, event information can be reported from a data source agent (e.g., 134A) based on network data that is obtained by its associated tool (e.g., 130A) and that is evaluated based on one or more configured thresholds (e.g., threshold exceeded, threshold met, threshold not met, etc.). For example, a server response time of a particular database server in the network, which is observed by tool A 130A and is determined to exceed a relevant threshold, may be considered an event. Consequently, metrics and event information can provide an end user with significantly increased insights into the network in the context of the known topology (or extended topology).

With reference to 335, in this example scenario, the set of network relations does not provide enough context for data source agent 134C to generate a contextual topology or derived network relations based on the set of network relations it receives. Consequently, at 335, a message may be sent to topology manager 150 indicating that nothing was found. In other embodiments, data source agent 134C may simply not respond to network topology 150 after receiving the set of network relations if no queries produced a match.

Once contextual topologies and derived network relations have been received from data source agent 134A (and possibly others not shown in FIG. 3), topology manager 150 can store the derived network relations in a storage element (e.g., cache, etc.). In at least one embodiment, the derived network relations can be added to the set of network relations 155. In this example, the derived network relations can represent the relationships between FE1 and the endpoints of the discovered client region. For example, derived network relations can include: [CR Endpoint1 IP address, FE1 IP address, FE1 port], [CR Endpoint2 IP address, FE1 IP address, FE1 port], etc.

Topology manager 150 can also reconcile the contextual topologies with each other and with the first known topology. An extended topology can be generated based on reconciling the contextual topologies and the first known topology. In this example, some vertices in the extended topology can correspond to FE1, BE (port 80) with the application instance. These vertices can each be represented by suitable identifying information (e.g., IP address, port, application identifier). Also, an edge in the extended topology can correspond to the connection between FE1 and BE (port 80) with the application instance. The connection can be represented by suitable identifying information (e.g., source Internet Protocol (IP) address, source port, destination IP address, destination port). Attributes associated with these nodes and connections may also be included. In addition, some other vertices of the extended topology may correspond to endpoints in the discovered client region, FE1, and connections between FE1 and each of the endpoints. The extended topology may include edges that correspond to connections between the endpoints and FE1. Thus, the extended topology includes new nodes, connections, and attributes.

At 340, the extended topology is sent to source tool 140. Also, at 345 (or at any other suitable times), the metrics and event information from data source agent 134A can be sent to source tool 140. In some embodiments, a topology extender/updater (e.g., 144) of source tool 140 may be provisioned as part of source tool 140 to receive extended topologies, to extend its topology model (e.g., network data inventory 145), and to add attributes to entities within the topology model. In other embodiments, a topology extender/updater may be provisioned separately from source tool 140 and may receive extended topologies, provide and provide an interface to extend the source tool's topology model and add attributes to entities within the topology model.

At 350, topology manager 150 can again request known topology from source tool 140. A second known topology is generated and, at 355, source tool 140 communicates the second known topology to topology manager 150. The source tool's view of the topology of network 110 may have changed since the first known topology was communicated to topology manager 150 at 310. After receiving the second known topology from source tool 140, topology manager 150 can update the stored set of network relations 155 based on the second known topology. Specifically, in at least one embodiment, topology manager 150 can extract any new topology information from the second known topology and generate new network relations to be added to the stored set of network relations. Topology manager 150 can also identify any removed topology from the second known topology and can remove corresponding known network relations from the stored set of network relations.

Once the set of network relations is updated by changes in the second known topology and by the derived network relations received at 325 (e.g., client region endpoints and FE1 relationships), at 360, topology manager 150 can send the updated set of network relations to data source agent 134C. It should be noted that the updated set of network relations could also be sent in parallel to data source agent 134A, and any other data source agents in the system. For ease of illustration, these additional communications are not shown.

Data source agent 134C can query network data inventory 135C associated with tool C 130C based on each network relation in the set of network relations. For example, data source agent 134C could query network data inventory 135C using the derived network relations that represent the connections between FE1 and the endpoints of the client region discovered by data source agent 134A. In this example scenario in which tool C monitors network flow in the network (e.g., 110), a query based on the addition of these derived network relations may return matches for derived network relations along with additional topology that includes routers and switches between the client region and FE1. New derived network relations can then be generated based on the discovered routers and switches. Contextual topologies can also be constructed for the new derived network relations. In addition, contextual topologies can be constructed for other network relations in the set of network relations that are used to successfully query network data inventory 135C.

By way of example, consider a query based on a derived network relation of [CR Endpoint1 IP address, FE1 IP address, FE1 port] that returns a router and switch between the CR Endpoint1 and FE1. New derived network relations can be generated that include [CR Endpoint1 IP address, Router IP address, Router port], [Router IP address, Switch IP address, Switch port], and [Switch IP address, FE1 IP address, FE1 port]. A contextual topology can also be constructed for each of the derived network relations and returned to topology manager 150.

At 365, the results from data source agent 134C are returned to topology manager 150. These results can include contextual topologies constructed for network relations that were used in successful queries of tool C's network data inventory 135C. The results can also include the network relations associated with the contextual topologies. The results can further include new derived network relations (based on the discovered routers and switches) and the contextual topologies constructed for the new derived network relations. At 370 (or at any other suitable times), data source agent 134C can communicate, to topology manager 150, metrics and event information that are relevant to the contextual topology or topologies generated by data source agent 134C.

Once contextual topologies and new derived network relations with related contextual topologies have been received from data source agent 134C (and possibly others not shown in FIG. 3), topology manager 150 can store the new derived network relations in a storage element (e.g., cache, etc.). In at least one embodiment, the derived network relations can be added to the set of network relations 155. In this example, the new derived network relations can represent the relationships between the client region endpoints, discovered routers and switches, and FE1.

Topology manager 150 can also reconcile the contextual topologies with each other and with the second known topology. An updated extended topology can be generated based on reconciling the contextual topologies and the second known topology. In this example, the updated extended topology can include vertices that correspond to FE1, the endpoints in the client region, and the discovered routers and switches. These vertices can each be represented by suitable identifying information (e.g., IP address, port). The updated extended topology can also include edges that correspond to the connections between FE1 and the endpoints of the client region. The connections can be represented by suitable identifying information (e.g., source Internet Protocol (IP) address, source port, destination IP address, destination port). Attributes associated with these nodes and connections may also be included. Thus, the updated extended topology includes new nodes, connections, and attributes. At 375, the updated extended topology is sent to source tool 140. Also, at 380 (or at any other suitable times), the metrics and event information received by the topology manager at 370 can be sent to source tool 140.

In summary, the data source agent for tool C (e.g., network flow monitoring) would not likely recognize the connection between FE1 and BE, so in the first pass of processing, the data source agent for tool C would not contribute any network topology back to the topology manager. The addition of client region entities and their connections into the known topology by the data source agent for tool A (e.g., end-to-end monitoring), however, would be passed down to the data source agent for tool C and other agents in a second pass of processing. At this point, the data source agent for tool C could have enough information to recognize that it can identity routers and switches between the client region and FE1, and that it can pass that topology back to the topology manager for another round of reconciliation and the generation of another extended topology to be returned to the source tool.

Figure 4A:
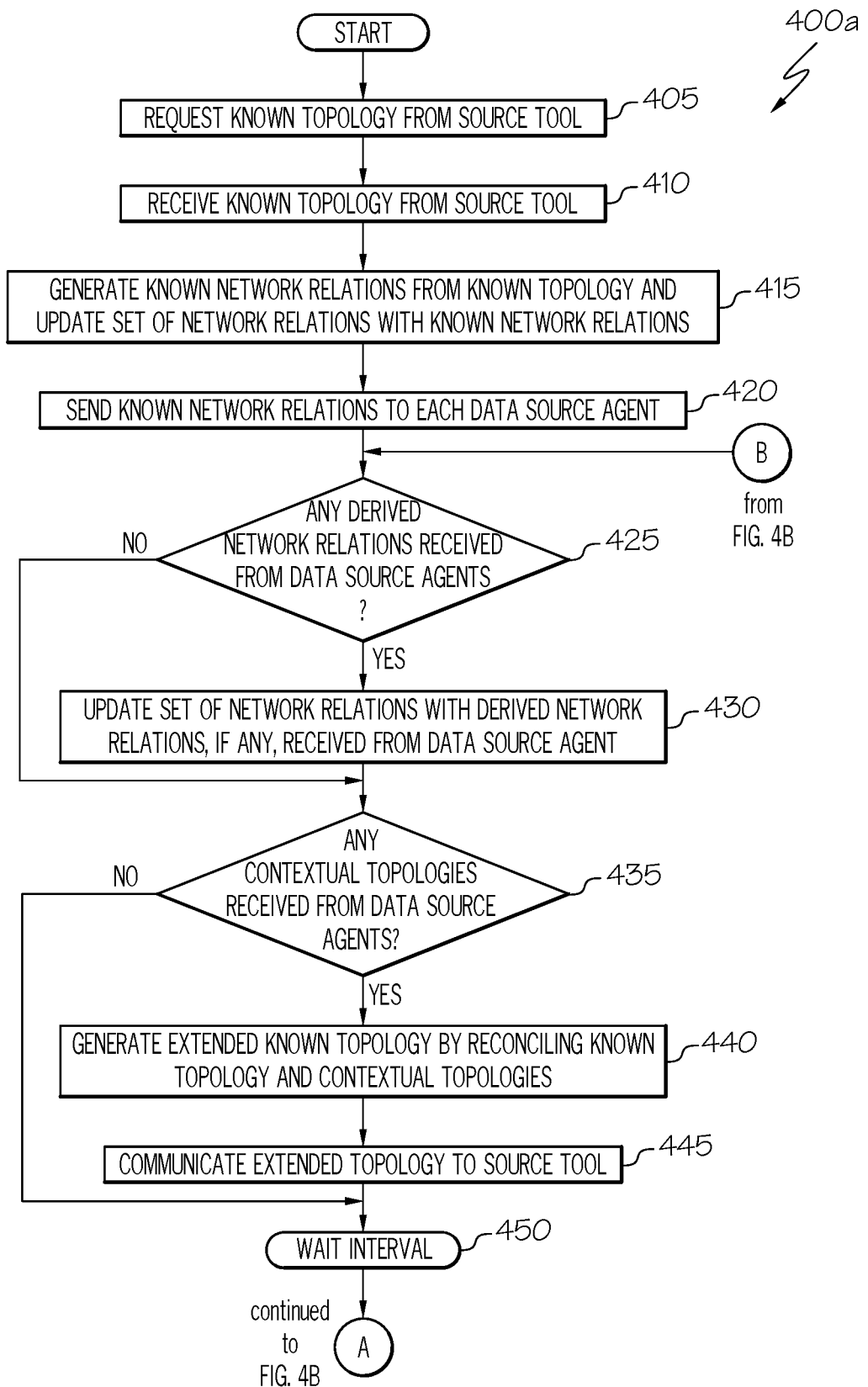
FIGS. 4A, 4B, 5, and 6 are simplified flowcharts illustrating example techniques associated with extending a known topology of a network environment, in accordance with at least one embodiment.
Figure 4B:
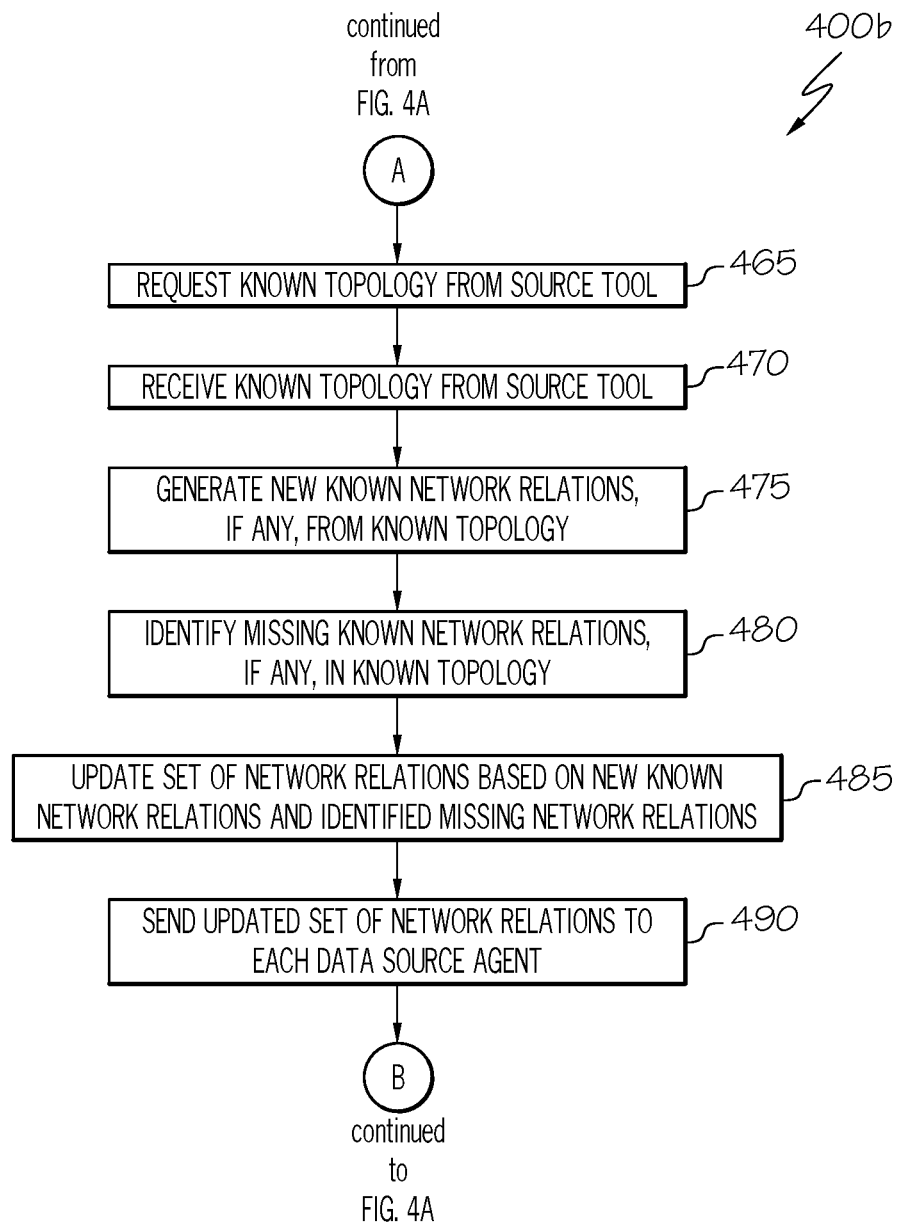

Turning to FIGS. 4A-4B, simplified flowcharts 400a-b are presented illustrating example techniques associated with a system for extending a known topology of a network using data obtained from monitoring the network. In at least one embodiment, one or more sets of operations correspond to activities of FIGS. 4A-4B. Topology manager 150 or a portion thereof, may utilize the one or more sets of operations. Topology manager 150 may comprise means such as processor 151, for performing the operations. In an embodiment, at least some operations of flows 400a-400b may be performed by a topology engine (e.g., 152) and at least some other operations of flows 400a-400b may be performed by a reconciliation engine (e.g., 154). In one example, flows 400a-400b of FIGS. 4A-4B may occur in system 200 where data source agents (e.g., 134A-134C) are associated with tools (130A-130C) that monitor nodes and/or connections between those entities in a network (e.g., 110).

At 405, a request is communicated for known topology of a network, as viewed by a source tool (e.g., 140), to be provided to the topology manager. At 410, the known topology is received from the source tool. In another embodiment, the known topology may be received from a component that is provisioned separately from source tool 140 and generates the known topology by data mining for topology model information (e.g., in network data inventory 145). At 415, topology manager can generate known network relations from the known topology, and can update a storage element, such as cache or other suitable storage element, with the known network relations. In one example, the known network relations can be added to the set of network relations 155. At 420, the set of network relations can be sent to each data source agent (e.g., 134A-134C) in the system. In this first pass, the set of network relations may include only the known network relations generated from the known topology.

The topology manager may receive results from one or more of the data source agents that receive the set of network relations. These results can include contextual topologies and possibly derived network relations. At 425, a determination is made as to whether any derived network relations were received from the data source agents. If any derived network relations were received, then at 430, they may be added to the set of network relations 155. The set of network relations may be stored in a storage element (e.g., a cache, etc.), which is accessible to the topology manager.

At 435, a determination can be made as to whether any contextual topologies were received from the data source agents. In at least one embodiment, contextual topologies may be received from a data source agent if the tool associated with that data source agent is aware of one or more of the network relations in the set of network relations. For example, a data source agent associated with a particular tool can use each network relation to query a network data inventory (e.g., 135A-135C) of the tool to determine whether the tool is aware of the network relation and, if so, whether the tool has additional contextual information (e.g., attributes, identifiers, contextual names and data, URLs, etc.) to add to the topologies associated with the network relation. Thus, if the tool is aware of a network relation, then the data source agent may obtain, from the tool, additional contextual information associated with the network relation, which can be passed back to the topology manager. Contextual topologies may also be received from a data source agent if the data source agent finds additional topology data (e.g., additional nodes connecting to a subsystem, additional nodes between nodes identified in a connection, etc.) associated with any of the nodes or connections identified in the set of network relations. Derived network relations and contextual topologies related to the derived network relations can be generated based on the additional discovered topology and the nodes or connections from the set of network relations that were used to discover the additional topology.

If results containing contextual topologies are received from one or more data source agents, as determined at 435, then at 440, an extended topology can be generated by reconciling the received contextual topologies with each other and with the known topology previously received from the source tool. The extended topology can be communicated to the source tool from the topology manager. In some embodiments, the extended topology can be communicated to a component provisioned separately from the source tool, but capable of interfacing with the source tool to update its known topology.

In at least one embodiment, the process of generating a set of network relations and communicating that set to data source agents may occur periodically, at particular intervals of time, or may be performed on demand as needed. An embodiment in which the set of network relations is updated at particular time intervals and communicated to the data source agents is depicted in FIGS. 4A-4B. At 450, processing may wait for a particular time interval to pass before updating the set of network relations and communicating the updated set of network relations to the data source agents. The wait interval may be any suitable time based on particular needs and implementations.

When the wait interval expires, at 465 of flow 400b, a request may again be communicated for known topology of the network, as viewed by the source tool (e.g., 140), to be provided to the topology manager. At 470, the newly-generated (current) known topology is received from the source tool. As previously described herein, in another embodiment, the known topology may be received from a component that is provisioned separately from source tool 140 and generates the known topology by data mining for topology model information (e.g., in network data inventory 145). At 475, the topology manager can generate new known network relations, if any, from the current known topology. New known network relations include any network relations indicated in the current known topology that are not included in the set of network relations stored in cache (or other appropriate storage element). At 480, the topology manager can identify any known network relations that are missing from the current known topology as compared to the set of network relations 155. At 485, the set of network relations can be updated based on the new known network relations and the identified missing network relations.

At 490, the updated set of network relations can be sent to each data source agent. It should be noted that the updated set of network relations may include derived network relations that were previously added to the set of network relations at 430. Thus, derived network relations discovered by one data source agent can be communicated back to the other data source agents and to itself. Once the data source agents have processed the updated set of network relations and sent any results back to the topology manager, processing may continue at 425 of flow 400a, as previously described herein. Thus, an updated extended topology is created and communicated to source tool 140 each time contextual topologies with new information are received. Processing may continue at predetermined intervals as indicated at 450.

In alternative embodiments, data source agents could be configured to dynamically send contextual topologies and possibly derived network relations to the topology manager, rather than waiting to be prompted by receiving a set of network relations. In an example of this embodiment, topology manager could generate an initial set of network relations based on known topology from the source tool, in any of the ways previously described herein. This set of network relations could be provided to all data source agents. As an initial matter, a data source agent may query the network data inventory of its associated tool based on the set of network relations that has been received. The data source agent can also begin monitoring data obtained by the corresponding tool during the tool's normal monitoring functions. For example, when the tool observes or otherwise obtains network data to be added to its network data inventory (e.g., 135A-135C), the data source agent can determine whether the new network data includes contextual information relevant to a network relation in the set of network relations. If the data source agent determines that the new network data includes contextual information relevant to a network relation, then a contextual topology with the additional contextual information (e.g., attributes, identifiers, contextual names and data, URLs, etc.) can be constructed for the network relation and dynamically sent to the topology manager. Similarly, when new network data is determined to include new topology relevant to a node or connection of a network relation, then a derived network relation can be generated, along with a contextual topology related to the derived network relation. This derived network relation and contextual topology can be sent to the topology manager. Additionally, as the topology manager updates its set of network relations based on derived network relations it receives from the data source agents and/or based on changes in the known topology received from the source tool, the topology manager can provide updated sets of network relations to the data source agents. These updated sets may be provided, for example, periodically based on particular intervals of time, on-demand whenever a change has occurred, or after a certain threshold number of changes has occurred in the set of network relations.

Figure 5:
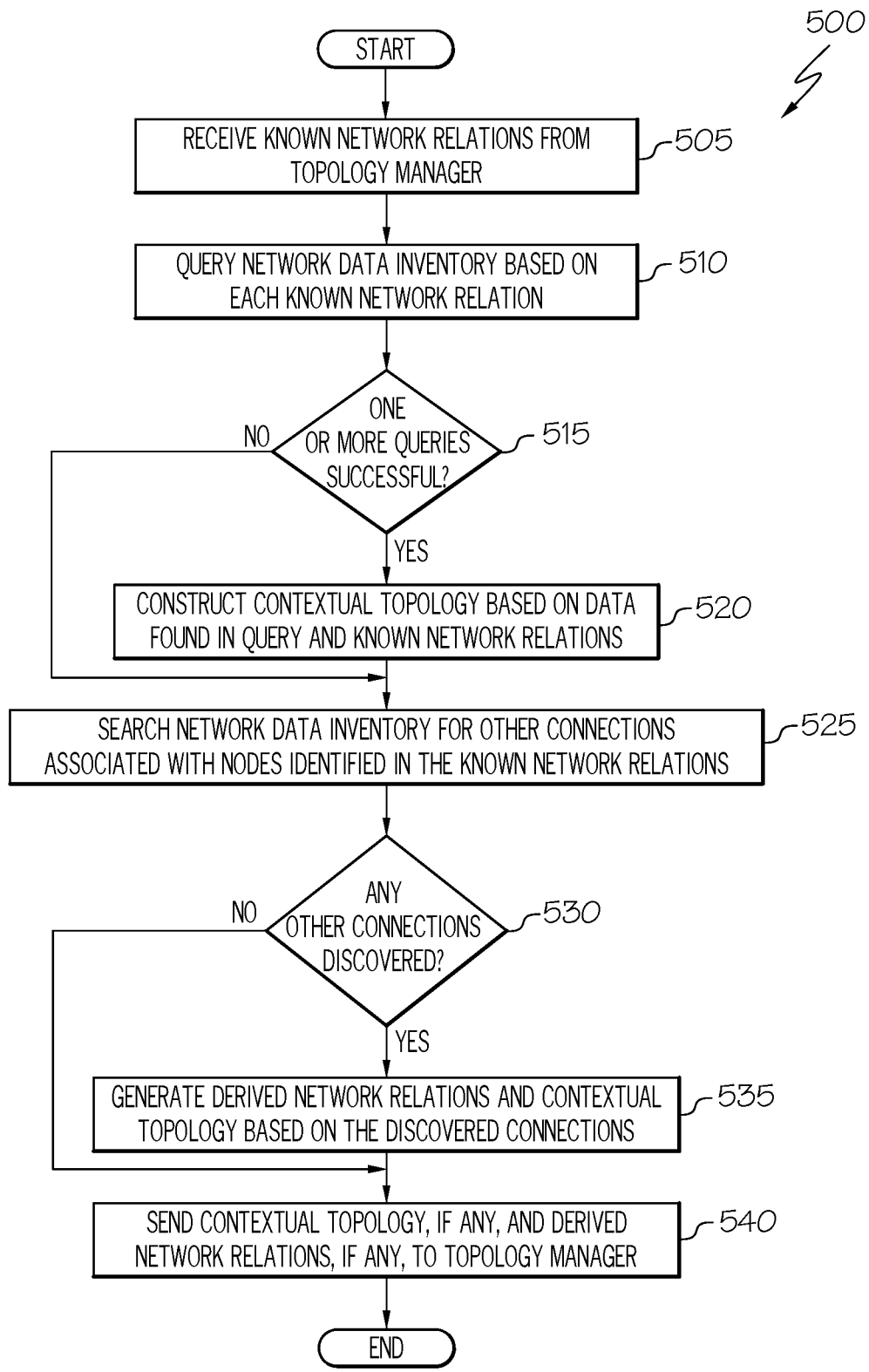

Turning to FIG. 5, a simplified flowchart 500 is presented illustrating example techniques associated with a system for extending a known topology of a network using data obtained from monitoring the network. In at least one embodiment, one or more sets of operations correspond to activities of FIG. 5. Each data source agent (e.g., 134A-134C), or a portion thereof, may utilize the one or more sets of operations. Data source agents may comprise means such as processors 131A, 131B, and 131C for performing the operations. In an embodiment, data source agents 134A-134C may be integrated with respective tools 130A-130C, such that at least some operations of flow 500 are performed by the tools. In other embodiments, data source agents 134A-134C may be provisioned in physical or virtual machines separately from, but in communication with, their associated tools 130A-130C and/or the network data inventories 135A-135C of the tools. Flow 500 may occur during a first pass, in which an initial set of network relations has been generated by a topology manager (e.g., 150) based on the first known topology of a network (e.g., 110) provided by a source tool (e.g., 140). For ease of illustration in describing flow 500, only data source agent 134A and its corresponding tool A 130A may be referenced. It should be apparent, however, that flow 500 may also be applicable to any other data source agents (e.g., 134B-134C) and their corresponding tools (e.g., 130B-130C) and network data inventories (e.g., 135B-135C).

At 505, data source agent 134A receives a set of network relations from topology manager 150. In the first pass, the set of network relations may only include known network relations extracted from the known topology received from the source tool. At 510, data source agent 134A can query network data inventory 135A of tool A 130A. Queries can be based on each known network relation from the set of network relations. At 515, a determination can be made as to whether one or more of the queries were successful. A query based on a particular known network relation is successful if the known network relation is identified in the network data inventory. A query based on a particular known network relation is unsuccessful if the known network relation is not identified in the network data inventory.

If a query is successful, then at 520, the data source agent can construct a contextual topology based on data found in the query and on the known network relation used to find the data. It should be appreciated that a contextual topology can be constructed, at 520, for each successful query. At 525, the data source agent may search the network data inventory for other connections related to nodes identified in the set of network relations. For example, a search based on a web-server identified in a particular known network relation may reveal that additional connections have been made to the webserver from other sources not identified in the known network relation. Thus, the search may return information about the other sources (e.g., client regions) that have established connections to the webserver, but that were not identified in the known topology from the source tool and, therefore, were not identified in the known network relations.

At 530, a determination can be made as to whether any other connections and associated nodes (or regions of nodes) were discovered by the data source agent. If any other connections and associated nodes are discovered, then at 535, the data source agent can generate derived network relations and contextual topologies based on the discovered connections. At 540, results of the data source agent processing the set of network relations can be sent to the topology manager. The results may include any contextual topology generated for one or more known network relations, along with those known network relations. The results may also include any derived network relations discovered by the data source agent (e.g., 134A) and contextual topologies generated for the discovered connections.

Figure 6:
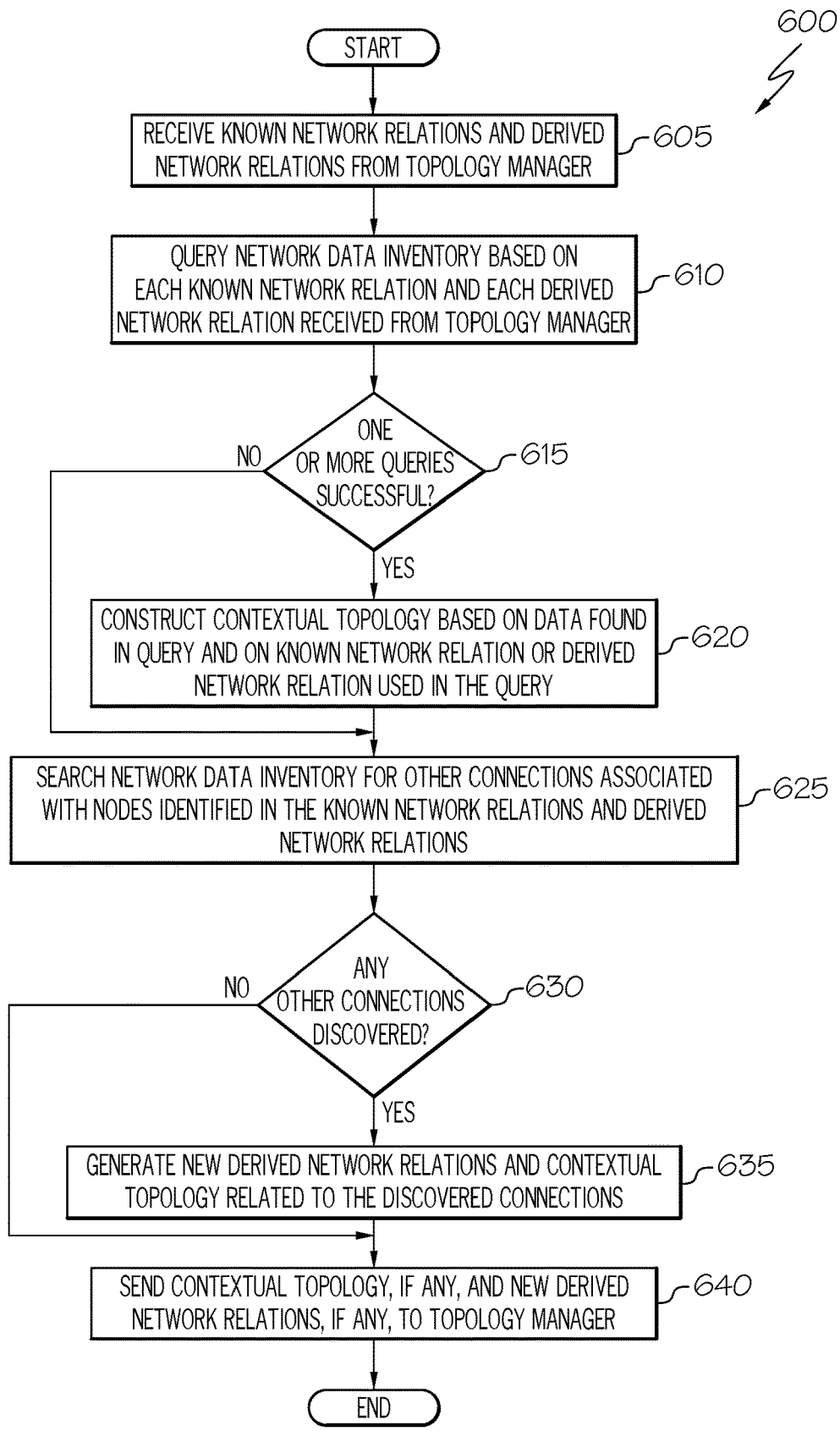

Turning to FIG. 6, a simplified flowchart 600 is presented illustrating example techniques associated with a system for extending a known topology of a network using data obtained from monitoring the network. In at least one embodiment, one or more sets of operations correspond to activities of FIG. 6. Each data source agent (e.g., 134A-134C), or a portion thereof, may utilize the one or more sets of operations. Data source agents may comprise means such as processors 131A, 131B, and 131C for performing the operations. In an embodiment, data source agents 134A-134C may be integrated with respective tools 130A-130C, such that at least some operations of flow 600 are performed by the tools. In other embodiments, data source agents 134A-134C may be provisioned in physical or virtual machines separately from, but in communication with, their associated tools 130A-130C and/or the network data inventories 135A-135C of the tools. Flow 600 may occur during a second or subsequent pass, in which a set of network relations has been updated by a topology manager (e.g., 150) based on one or more derived network relations received from one or more data source agents during a prior pass. For ease of illustration in describing flow 600, only data source agent 134C and its corresponding tool C 130C may be referenced. It should be apparent, however, that flow 600 is also applicable to any other data source agents (e.g., 134A-134B) and their corresponding tools (e.g., 130A-130B) and network data inventories (e.g., 135B-135C).

At 605, data source agent 134C receives an updated set of network relations from topology manager 150. The updated set of network relations includes known network relations corresponding to a known topology of source tool 140 (e.g., the most recently received known topology) and derived network relations received from one of the data source agents during a prior pass. At 610, data source agent 134C can query network data inventory 135C of tool C 130C. Queries can be based on each known network relation and each derived network relation from the updated set of network relations. At 615, a determination can be made as to whether one or more of the queries were successful. A query based on a particular known network relation or derived network relation is successful if the known network relation or derived network relation is identified in the network data inventory. A query based on a particular known network relation or derived network relation is unsuccessful if the known network relation or derived network relation is not identified in the network data inventory.

If a query is successful, then at 620, the data source agent can construct a contextual topology based on data found in the query and based on the known network relation(s) and/or the derived network relation(s) used to find the data. It should be appreciated that a contextual topology can be constructed, at 620, for each successful query based on one of the network relations in the updated set of network relations. At 625, the data source agent may search the network data inventory for other connections related to nodes identified in the updated set of network relations. The search can be based on nodes from the known network relations and from any derived network relations included in the updated set of network relations.

At 630, a determination can be made as to whether any other connections and associated nodes (or regions of nodes) were discovered by the data source agent. If any other connections and associated nodes are discovered, then at 635, the data source agent can generate new derived network relations and contextual topologies based on the discovered connections. At 640, results of the data source agent processing the updated set of network relations can be sent to the topology manager. The results may include any contextual topology generated for one or more known network relations and derived network relations, along with those known and/or derived network relations. The results may also include any new derived network relations discovered by data source agent 134C and contextual topologies generated based on the discovered connections.

The flowcharts and block diagrams in the Figures illustrate the architecture, functionality, and operation of possible implementations of systems, methods, apparatuses, and computer program products according to various aspects of the present disclosure. In this regard, each block or interaction in the flowchart illustrations, interaction diagram, or block diagrams may represent a module, segment, or portion of code, which comprises one or more executable instructions for implementing the specified logical function(s). It should also be noted that, in some alternative implementations, the functions noted in the block or interaction may occur out of the order noted in the figures. For example, two blocks or interactions shown in succession may, in fact, be executed substantially concurrently, or the blocks or interactions may sometimes be executed in the reverse order, depending upon the functionality involved. It will also be noted that each block or interaction of the block diagrams, interaction diagram, and/or flowchart illustrations, or combinations of blocks or interactions in the block diagrams, interaction diagram, and/or flowchart illustrations, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but does not preclude the presence or addition of one or more other features, integers, steps, operations, elements, components, and/or groups thereof.

As used herein, unless expressly stated to the contrary, use of the phrase 'at least one of' refers to any combination of the named elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z. Also, references in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
   generating a known network relation from a known topology of a network, wherein the known network relation comprises a set of nodes;
   sending the known network relation, in parallel, to a first data source agent associated with a first tool configured with a first monitoring capability to monitor the network and to a second data source agent associated with a second tool configured with a second monitoring capability to monitor the network, wherein the sending enables the first data source agent to identify a first set of nodes corresponding to the set of nodes of the known network relation and enables the second data source agent to identify a second set of nodes corresponding to the set of nodes of the known network relation;
   receiving a first contextual topology of the network from the first data source agent, wherein the first contextual topology comprises a first graph of nodes having respective first attributes and is based on the known network relation and first data associated with the first tool, wherein the first graph of nodes comprises the first set of nodes corresponding to the set of nodes of the known network relation, wherein each node of the first set of nodes comprises a respective first attribute, wherein the first tool is different from the first data source agent, wherein the first data comprises data associated with the first set of nodes, and wherein the first set of nodes are different from the first data source agent;
   receiving a second contextual topology of the network from the second data source agent, wherein the second contextual topology comprises a second graph of nodes having respective second attributes different from the respective first attributes and is generated by the second tool configured with the second monitoring capability to monitor the network, wherein the second graph of nodes comprises the second set of nodes corresponding to the set of nodes of the known network relation, wherein each node of the second set of nodes comprises a respective second attribute different from the respective first attribute, wherein the second tool is different from the second data source agent, wherein the second monitoring capability is different from the first monitoring capability, and wherein the first tool obtains a first type of information, from at least the respective first attributes, based on the first monitoring capability, and the second tool obtains a second type of information, from at least the respective second attributes, based on the second monitoring capability; and
   generating an extended topology by reconciling the known topology with at least the first contextual topology and the second contextual topology.

2. The method of claim 1, wherein the known topology is associated with a node in the network monitored by a source tool, the method further comprising:
   communicating the extended topology to the source tool.

3. The method of claim 1, wherein the known topology comprises information identifying a plurality of nodes in the network and a connection between two nodes of the plurality of nodes.

4. The method of claim 1, wherein the first data is obtained by the first tool that monitors network communications in the network.

5. The method of claim 1, wherein the known network relation comprises first information indicating a connection between a first node and a second node in the network.

6. The method of claim 5, wherein the first information comprises a source Internet Protocol (IP) address, a destination IP address, and a destination port.

7. The method of claim 5, wherein the first contextual topology comprises second information identifying the first node, the second node, and a connection between the first node and the second node.

8. The method of claim 5, wherein the first contextual topology comprises attributes of the first node and the second node, wherein the attributes are obtained from the first data.

9. The method of claim 5, wherein the first contextual topology comprises a containment relationship of the first node.

10. The method of claim 5, further comprising:
    receiving, from the first data source agent, metrics data of the first node collected by the first tool.

11. The method of claim 5, further comprising:
    receiving, from the first data source agent, event data of the first node collected by the first tool.

12. The method of claim 1, further comprising:
    receiving a derived network relation from the first data source agent;
    sending the derived network relation to the second data source agent associated with the second tool; and
    receiving the second contextual topology based, at least in part, on the derived network relation and second data associated with the second tool.

13. The method of claim 12, further comprising:
    updating a set of network relations to comprise the derived network relation, wherein the set of network relations comprises the known network relation.

14. The method of claim 13, wherein the sending the derived network relation to the second data source agent comprises:
    sending the updated set of network relations to the second data source agent.

15. The method of claim 12, wherein the derived network relation comprises a client region in the network, wherein the first data indicates a connection between the client region and a node indicated in the known topology.

16. The method of claim 12, further comprising:
receiving the known topology prior to generating the extended topology; and
updating a set of network relations based on the known topology.

17. The method of claim 1, further comprising:
receiving, from the first data source agent, a third contextual topology related to a derived network relation, wherein the derived network relation is associated with a node indicated by the known network relation, and wherein the generating the extended topology comprises reconciling the known topology with the third contextual topology.

18. A system comprising:
a first data source agent associated with a first tool configured with a first monitoring capability to monitor a network, the first data source agent to:
receive a known network relation generated from a known topology of the network;
query a storage element based on the known network relation; and
construct a first contextual topology based on the known network relation and first data obtained from querying the storage element, wherein the first contextual topology comprises a first graph of nodes having respective first attributes, wherein the first graph of nodes comprises a first set of nodes, wherein each node of the first set of nodes comprises a respective first attribute, wherein the first tool is different from the first data source agent, wherein the first data comprises data associated with one or more nodes of the first set of nodes, and wherein the one or more nodes are different from the first data source agent;
a second data source agent associated with a second tool configured with a second monitoring capability to monitor the network, wherein the second monitoring capability is different from the first monitoring capability, the second data source agent to:
construct a second contextual topology associated with the network, wherein the second contextual topology comprises a second graph of nodes having respective second attributes different from the respective first attributes, wherein the second graph of nodes comprises a second set of nodes, wherein each node of the second set of nodes comprises a respective second attribute different from the respective first attribute, wherein the second tool is different from the second data source agent, and wherein the first tool is configured to obtain a first type of information, from at least the respective first attributes, based on the first monitoring capability, and the second tool is configured to obtain a second type of information, from at least the respective second attributes, based on the second monitoring capability; and
a topology manager to:
receive the first contextual topology and the second contextual topology; and
generate an extended topology by reconciling the known topology with at least the first contextual topology and the second contextual topology.

19. The system of claim 18, wherein the topology manager is to further:
receive a derived network relation from the first data source agent;
send the derived network relation to the second data source agent; and
receive the second contextual topology based, at least in part, on the derived network relation and second data obtained by the second data source agent querying a second storage element based on the derived network relation.

20. A computer program product comprising a non-transitory computer readable storage medium comprising computer readable program code embodied therewith, the computer readable program code comprising:
computer readable program code configured to generate a known network relation from a known topology of a network;
computer readable program code configured to send the known network relation to a first data source agent associated with a first tool configured with a first monitoring capability to monitor the network;
computer readable program code configured to receive a first contextual topology of the network from the first data source agent, wherein the first contextual topology comprises a first graph of nodes having respective first attributes and is based on the known network relation and first data associated with the first tool, wherein the first graph of nodes comprises a first set of nodes, wherein each node of the first set of nodes comprises a respective first attribute, wherein the first tool is different from the first data source agent, wherein the first data comprises data associated with one or more nodes of the first set of nodes, and wherein the one or more nodes are different from the first data source agent;
computer readable program code configured to receive a second contextual topology of the network from a second data source agent, wherein the second contextual topology comprises a second graph of nodes having respective second attributes different from the respective first attributes and is to be generated by a second tool configured with a second monitoring capability to monitor the network, wherein the second monitoring capability is different from the first monitoring capability, wherein the second graph of nodes comprises a second set of nodes, wherein each node of the second set of nodes comprises a respective second attribute different from the respective first attribute, wherein the second tool is different from the second data source agent, and wherein the first tool is configured to obtain a first type of information, from at least the respective first attributes, based on the first monitoring capability, and the second tool is configured to obtain a second type of information, from at least the respective second attributes, based on the second monitoring capability; and
computer readable program code configured to generate an extended topology by reconciling the known topology with at least the first contextual topology and the second contextual topology.

21. The computer program product of claim 20, wherein the first data is associated with the first tool that monitors network communications in the network.

22. The computer program product of claim 20, wherein the known network relation comprises information indicating a connection between a first node and a second node in the network.

23. The computer program product of claim 20, wherein the known topology comprises information identifying a plurality of user-selected nodes in the network and a user-selected connection between two nodes in the network, wherein the information is associated with a source tool configured to monitor the plurality of user-selected nodes.

24. The computer program product of claim 20, the computer readable program code further comprising:
- computer readable program code configured to receive a derived network relation from the first data source agent;
- computer readable program code configured to send the derived network relation to a third data source agent associated with a third tool configured with a third monitoring capability to monitor the network;
- computer readable program code configured to receive a third contextual topology based, at least in part, on the derived network relation and third data associated with the third tool; and
- computer readable program code configured to generate an updated extended topology of the network based, at least in part on the third contextual topology.

\* \* \* \* \*